(12) United States Patent
Persoons et al.

(10) Patent No.: US 7,104,465 B2
(45) Date of Patent: Sep. 12, 2006

(54) WATER SPRAY RETORT SYSTEM SUITABLE FOR PAPERBOARD PACKAGES

(75) Inventors: Gustaaf Persoons, Brecht (BE); Hans De Cock, Sint-Niklaas (BE); Marc Roels, Sint-Niklaas (BE)

(73) Assignee: FMC Technologies, Inc., Houston, TX (US)

( * ) Notice: Subject to any disclaimer, the term of this patent is extended or adjusted under 35 U.S.C. 154(b) by 114 days.

(21) Appl. No.: 10/435,491

(22) Filed: May 9, 2003

(65) Prior Publication Data

US 2004/0222311 A1    Nov. 11, 2004

(51) Int. Cl.
B05B 9/06 (2006.01)
B05B 1/08 (2006.01)
B05B 9/00 (2006.01)
B05B 1/32 (2006.01)
A62C 18/00 (2006.01)

(52) U.S. Cl. .................. 239/100; 239/101; 239/124; 239/126; 239/270; 239/450; 239/548

(58) Field of Classification Search ................ 239/101, 239/124, 126, 270, 418, 450, 548, 553.3, 239/554, 556, 566, 601, 592, 593, 594
See application file for complete search history.

(56) References Cited

U.S. PATENT DOCUMENTS

| | | | | |
|---|---|---|---|---|
| 2,282,187 A | | 5/1942 | Herold et al. | |
| 3,589,611 A | * | 6/1971 | Jones, Jr. | 239/132 |
| 4,060,914 A | * | 12/1977 | Hoffman | 34/219 |
| 4,221,638 A | * | 9/1980 | Jones, Jr. | 202/121 |
| 4,371,335 A | * | 2/1983 | Jones | 432/95 |
| 4,401,051 A | * | 8/1983 | Gunther | 118/326 |
| 4,669,667 A | * | 6/1987 | Perkins et al. | 239/467 |
| 4,738,617 A | * | 4/1988 | Zimmerman | 432/95 |
| 5,561,027 A | * | 10/1996 | Verlinden et al. | 430/204 |
| 5,664,482 A | | 9/1997 | Graham et al. | |
| 5,685,326 A | * | 11/1997 | Cord et al. | 134/63 |

* cited by examiner

Primary Examiner—Davis Hwu
(74) Attorney, Agent, or Firm—Christensen O'Connor Johnson Kindness pllc

(57) ABSTRACT

A retort is described for use with paperboard containers (48) to reduce moisture absorption during processing of foodstuffs therein. The improvement includes using solid cone spray nozzles (50) with spray angles in the range of about 100 degrees to about 115 degrees. In one embodiment, the distance (D') between the nozzles and the container is in the range of about 70 mm to about 200 mm. In another embodiment, the flow rate if each nozzle (50) is reduced relative to known systems, while the total vessel flow rate is kept the same as per cubic meter load. Further, an overpressure may be added to the vessel via compressed air. In accordance with other aspects, an Impact reduction is used which relates nozzle flow rate, pressure, distance, etc. with moisture absorption in paperboard containers.

20 Claims, 3 Drawing Sheets

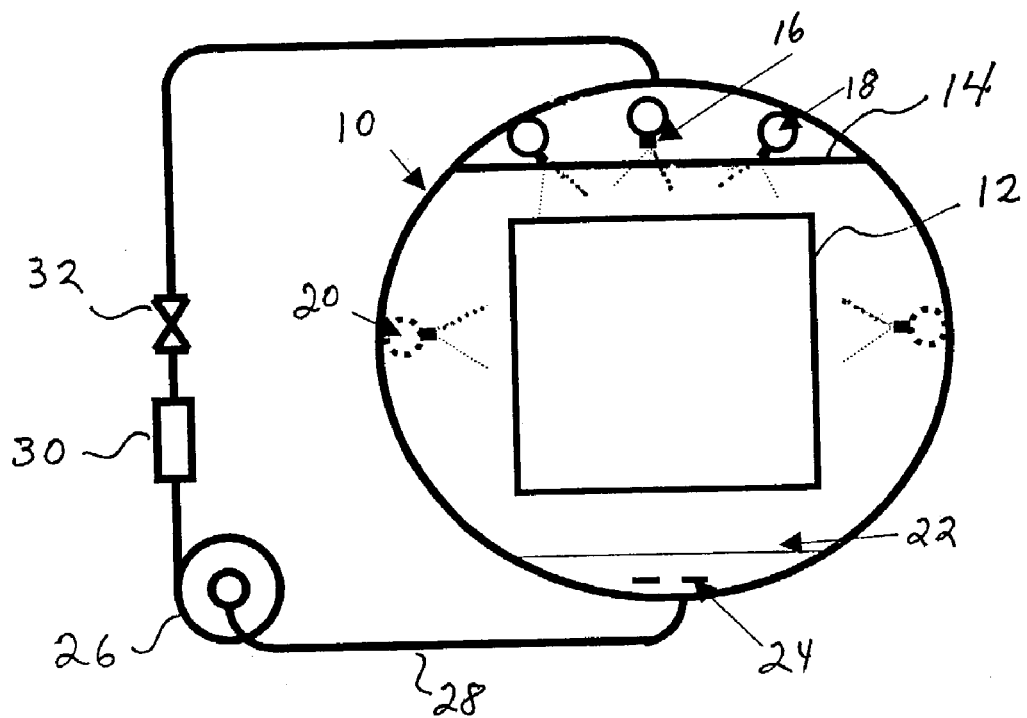
FIGURE 1, PRIOR ART
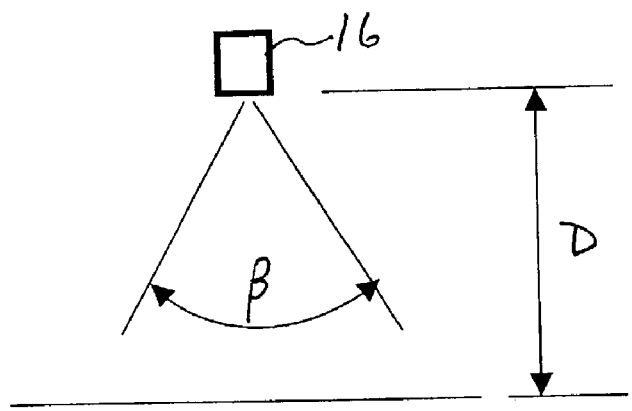
FIGURE 2, PRIOR ART

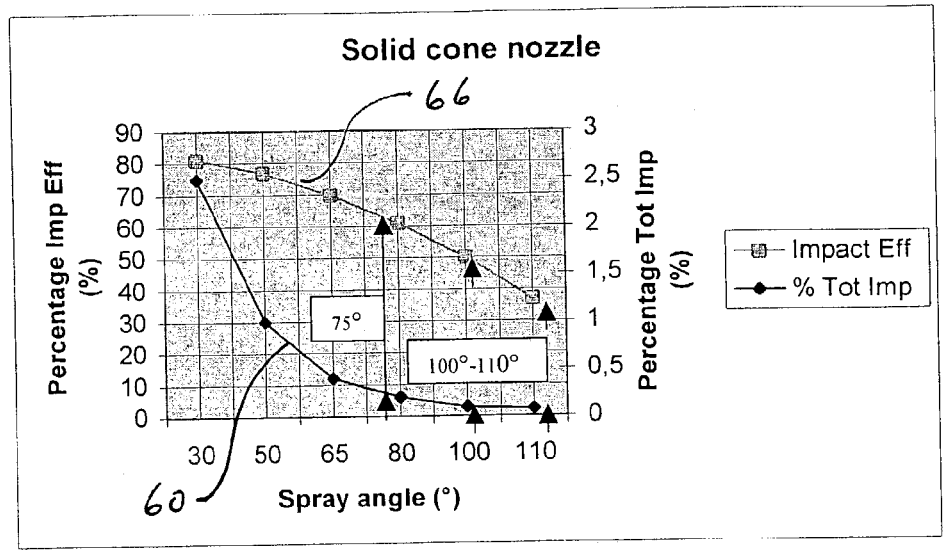
FIGURE 5
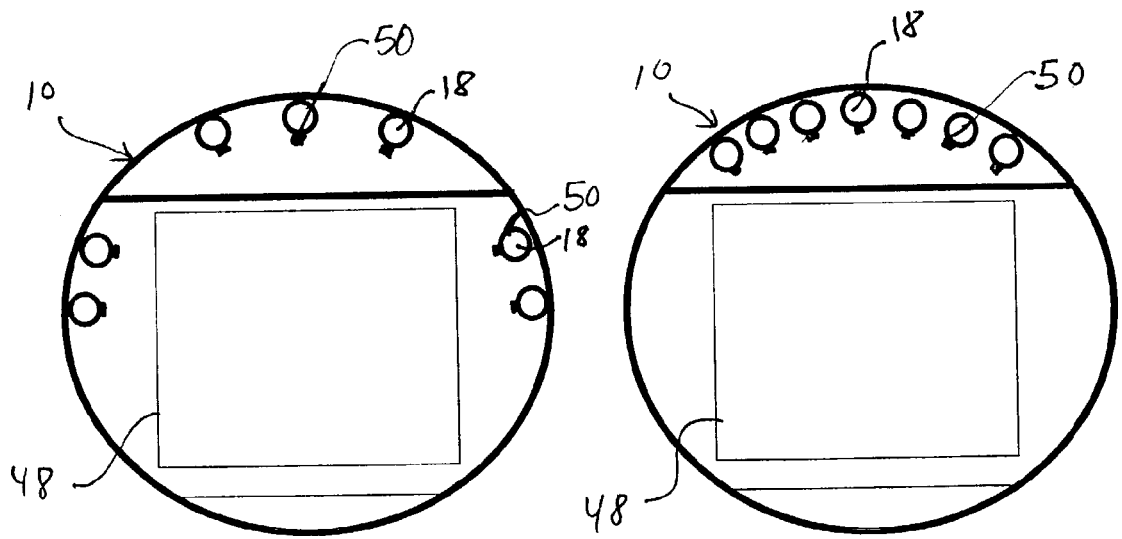
FIGURE 6  FIGURE 7

WATER SPRAY RETORT SYSTEM SUITABLE FOR PAPERBOARD PACKAGES

FIELD OF THE INVENTION

The present invention relates to retort systems for in-container preservation of foodstuffs, and more particularly, to retort systems that use spray water to aid in the distribution and mixing of steam and air within a sealed vessel.

BACKGROUND OF THE INVENTION

Overpressure retorts are used for the in-container preservation of foodstuffs, either for pasteurization or sterilization processes. In general, these machines use a combination of pressure and temperature to sterilize packaged food according to a predefined schedule. Their popularity has increased in the past few years because of the development of processes that allow for the use of media other than only saturated steam. Using other fluids enables the application of an additional partial overpressure on top of the basic steam vapor pressure associated with the process temperature. Such additional overpressure is useful in coping with new types of containers that are being introduced on the market.

The additional overpressure is usually achieved by adding air to the interior of the retort vessel. As air has poor heat transfer properties, the mixture of steam and air has to be assisted for good heat transfer to the containers and their content. This can be accomplished in any number of ways. In steam-air retorts, the mixture is recirculated through the retort load by means of fans. In full immersion retorts, the load is immersed in water. In trickling water type retorts, water is trickled from the top of the retort to the bottom, passing through the load in-between. In spray water retorts, water is sprayed from the top (and optionally also from the sides) of the container through the load. The latter type can make use of external means to heat the water or alternatively can have direct steam injection into the vessel.

FIG. 1 illustrates a recirculation system in a known spray water retort. A cylindrical pressure vessel 10 houses a load 12, a header 14, and various spray nozzles 16. The load is supported on a horizontal pallet (not shown). Distribution pipes 18 extend the longitudinal length of the vessel. Using the various spray nozzles 16, the distribution pipes 18 direct process water into the vessel and onto the load. The header 14 is positioned at select locations needed to support the distribution network (e.g., in the middle of the vessel). Use of side spray nozzles 20 is optional, depending on the type of load being processed. In general, the spray pattern shown provides a good distribution of process water through the load. The process water is collected in a lower sump 22, passed through a strainer 24, and recirculated through the system via a recirculation pump 26. The recycled process water is passed through piping 28 and one or more filters 30 and then reintroduced to the distribution pipes. Control valves 32 regulate the recirculation process.

Referring to FIG. 2, the nozzles used have a solid cone spray characteristic, with a cone angle β of approximately 75 degrees. This angle can vary slightly, depending on the pressure of the fluid in the distribution pipes. In one arrangement, this pressure is on the order of 1 bar overpressure. The distance D between the nozzles and the load in prior art arrangements is generally in the range of about 70 mm to about 200 mm. The distance is chosen so that the spray water flowing through the load provides a good temperature distribution. The load may be baskets (which are typically used for cans and jars) or stacks of trays (which are typically used for containers that are not rigid enough to allow stacking on top of each other, e.g., plastic lunch bowls and pouches).

During use, the load is subjected to a preservation phase having a predefined temperature schedule and a predefined pressure schedule. The temperature distribution is important within each individual basket or stack, and also between the different baskets or stacks placed along the length of the retort. The fluid flow per nozzle and the number of nozzles in the retort system determine the total flow of process water being continuously recirculated over and through the load. From experience it was found that satisfactory temperature distributions are achieved with a flow capacity per processing position (i.e., a basket or stack) of approximately 30 $m^3$/hr per cubic meter load for static processing retorts, and, 40 $m^3$/hr for agitation processing retorts. A typical flow per nozzle is in the order of 17 liters/min. In some arrangements, the recirculation system is also used for cooling the load after completion of the preservation phase.

Recently, a new type of paperboard package has been introduced for use with various types of foodstuffs. These packages are generally composed of a coated paperboard folded into a rectilinear shape. Currently, fluids such as juices, soups, soy milk, etc. are packaged in these kinds of containers. The packages have some degree of protective coatings on their surfaces, but, in general, are susceptible to fluid absorption along their exposed edges. The edges typically do not receive coatings due to manufacturing cost considerations. The amount of absorption that may occur is a factor in determining the package quality. If there is too much absorption, the package will be considered defective.

The spray water retort process described above has been found to cause excessive fluid absorption in some paperboard packages. Thus, a need exists for an improved retort system that reduces the amount of absorption and thereby reduces the number of defective packages. The present invention is directed to fulfilling these needs and others as described below.

SUMMARY OF THE INVENTION

In accordance with teachings of the present invention, a retort system is described that uses one or more solid cone spray nozzles with spray angles in the range of about 100 degrees to about 115 degrees. Multiple embodiments are described that alter other aspects of the retort process in order to adjust to the wide angle nozzles and reduce moisture absorption in a paperboard container during processing of foodstuffs therein.

In one embodiment, the distance between the nozzles and the container is in the range of about 70 mm to about 200 mm. In another embodiment, the flow rate if each nozzle is reduced relative to known systems, while the total vessel flow rate is the same as known systems as per cubic meter load. Further, an overpressure may be added to the vessel via compressed air. In accordance with other aspects, an Impact value is defined which relates nozzle flow rate, pressure, distance, etc. with moisture absorption in paperboard containers.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 1 is a schematic cross-sectional side view prior art spray water retort system;

FIG. 2 is a schematic side view of a prior art spray nozzle;

FIG. 5 is a table showing spray characteristics of wide spray nozzles relative to a straight jet nozzle;

FIG. 6 is a schematic cross-sectional side view of an alternative embodiment of a retort system formed in accordance with the present invention; and FIG. 7 is a schematic cross-sectional side view of another embodiment of a retort system formed in accordance with the present invention.

DETAILED DESCRIPTION OF THE PREFERRED EMBODIMENT

The inventors herein have determined that the impact of the water droplets from the nozzles on a container is an important parameter in causing edgewise moisture penetration. As used herein, the term "container" 48 is meant to describe a load that includes a paperboard component. The greater the droplet impact on the container, the greater the moisture penetration into the exposed paperboard edges. The droplet impact administered to a load in prior art nozzle arrangements has resulted in excessive moisture penetration into exposed paperboard edges. The present invention includes a number of features that seek to decrease the impact of the water droplets by altering the nozzle characteristics and impact pattern. These features may be used singularly or jointly depending on the characteristics of the container and depending on the pressure and temperature profiles required for the particular foodstuff.

Figure 3:
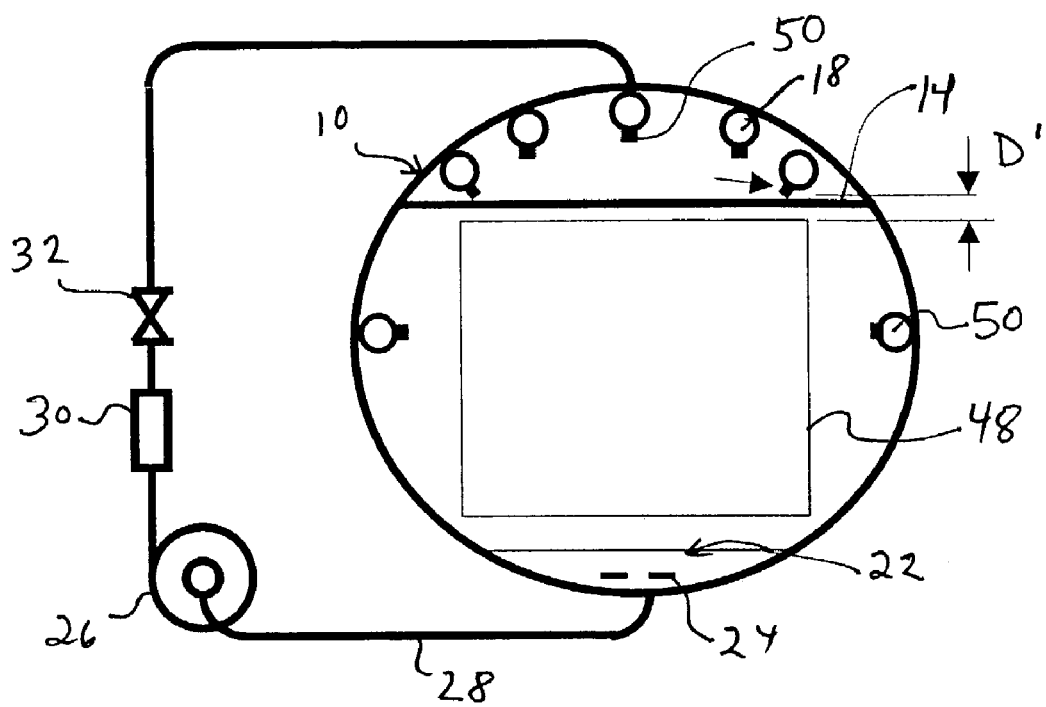
FIG. 3 is a schematic cross-sectional side view of one embodiment of a spray water retort system formed in accordance with the present invention.
Figure 4:
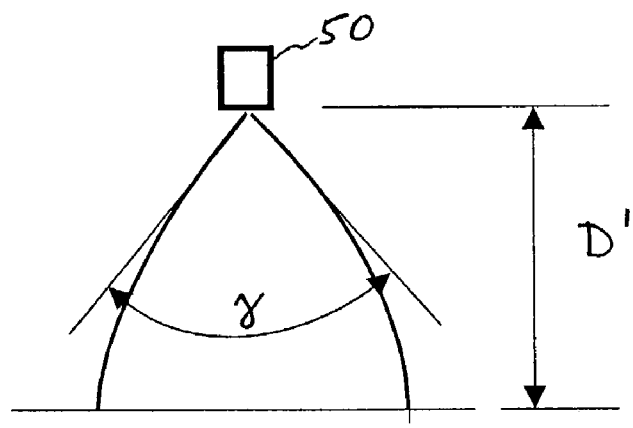
FIG. 4 is a schematic side view of one embodiment of a spray nozzle formed in accordance with the present invention.

Referring to FIGS. 3 and 4, the present invention includes the use of a water spray nozzle with a wider spray range. Instead of using a nozzle with a spray angle of 75 degrees (as in FIG. 2), the present invention uses a nozzle 50 with a spray angle γ in the range of about 100 degrees to about 115 degrees. The nozzle 50 is still preferably a solid cone nozzle. As used herein with respect to the present invention, the adjective "solid cone" refers to spray volumes having two dimensional base shapes—for example, circular as well as non-circular base shapes (squares, triangles, etc.) Alternatively, air-atomizing nozzles that produce a cloud of small droplets could be used. Using a wider spray angle results in an increase in the spray width and overall spray area. In one embodiment, the distance D' between the nozzle 50 and the container contact surface is in the range of about 70 mm to about 200 mm, with the shorter distance typically occurring at the tops of the load. See FIG. 3 particularly. In another embodiment, good results have been obtained using a minimum distance of 100 mm.

In addition, the flow capacity of the wider spray nozzles may be reduced to an amount in the range of about 5.5 liters/min to about 7 liters/min, which is approximately 40% of the prior flow capacity. Reducing the flow of the nozzles, however, can have an adverse effect on the temperature distribution. In order to assure that a good temperature distribution is maintained in the retort load, the number of nozzles has been increased so that the total flow is equivalent to the pre-existing total flow levels, as per cubic meter of load.

In FIG. 3, the crosswise number of distribution pipes is increased from 3 to 5 top pipes, with a corresponding increase in nozzles per processing station as well. Further, distribution pipes and nozzles 50 are located on each side. FIGS. 6 and 7 show alternative embodiments with increased distribution and nozzle arrangements. It should be understood that any alternative distribution arrangement or number of nozzles which results in similar flow characteristics through the container and which provides the reduced droplet impact on the container, is to be regarded as similar to the above described solution, and, as a consequence, part of the present invention.

Reducing the flow capacity per nozzle to a level at or below approximately 5 liters/min is not generally advisable. While doing so will reduce the droplet impact on the container, it will also require the use of a large number of nozzles in order to maintain the total flow—which adds cost of the system. Furthermore, such reduced flow nozzles have typically smaller orifices that could easily clog with debris, scale particles, or other objects.

To further understand the relationship between nozzle spray angle and impact force, the inventors have used a system of numerically defining what arrangements will produce satisfactorily low levels of edge-wicking. This system uses an "Impact" value that is defined below. First, however, referring to FIG. 5, a graphical illustration of the relationship between nozzle spray angle and a solid cone nozzle's percentage impact efficiency and its percentage total impact force is described visually.

In FIG. 5 there are two lines plotted. The lower line 60 is a plot of the percentage of the total impact that would be felt at a given distance between the nozzle and the receiving surface, according to a given spray angle, and as compared to a straight jet of water. The upper line 66 is a plot of the percentage of the droplet impact efficiency of a nozzle at the same distance, according to a given spray angle. A reduction in efficiency means the impact effect is reduced when the spray angle increases (due to flow losses occurring inside the nozzle.)

For example, a straight jet of water would produce a total impact force of X amount at a given distance of Y between the nozzle and the impact surface. A nozzle having a spray angle of 75 degrees for the same circumstances would result in an impact force at the container surface that is only 0.25% of the total impact force of the straight jet nozzle. The droplet impact efficiency for the 75 degree spray angle nozzle would be roughly 65% of the value of the droplet impact efficiency for the straight jet nozzle.

As will be appreciated from viewing FIG. 5, widening the spray angle does not significantly lower the percentage of the total impact force that is used, but instead lowers the droplet impact efficiency of the nozzle. A lower impact efficiency means less edge-wicking will occur. By enlarging the spray angle from 75 degrees to 110 degrees, these efficiencies reduce from about 65% and 0.25% to about 38% and 0.1%, respectively, resulting in approximately 4 times less efficiency (i.e., the result of (65/38)×(0.25/0.1).

The inventors herein have used a numeric relationship between the impact on a paperboard container and the amount of edge-wicking on the containers closest to the nozzles. The Impact is defined as:

$$\text{Impact} = (0.0324) \cdot (\text{Flow}) \cdot \sqrt{\text{pressure}} \cdot (\text{Imp Eff}) \cdot (\text{Perc Tot Imp}) \cdot (\text{Distance Factor})$$

where 0.0324 is a numerical adjustment factor (due to the units used), Flow is the flow rate through the nozzle in units of liter/min, pressure is the supply pressure of the nozzle in units of kg/cm², Imp Eff is the impact efficiency (unitless), Perc Tot Imp is the percentage of the total theoretical impact (unitless); and Distance Factor is a unitless factor correcting for distance that is different from 30 cm (for which the data is given in FIG. 5.)

Current experimental tests have determined that an Impact reduction of 8 or greater (versus the pre-existing value) results in acceptably low levels of edge-wicking on the containers closest to the nozzles, while maintaining a good temperature distribution in each of the load positions throughout the complete retort process. Impact reduction below 8 appears to result in too great of edge-wicking. Thus, a designer should adjust the number of nozzles, the nozzle spray angles, nozzle water pressure, flow rate, and distance, etc. between the nozzle and the container accordingly. In one embodiment, good results have been found using an Impact reduction of about 10. In absolute terms, a safe impact of 0.00012 kg/cm2 or less is preferred, though positive effects may be experienced with an impact of 0.00014 kg/cm2.

To use the retort system, at the outset, the load is placed in the vessel and the vessel doors are closed. The recirculation pump is started, and the process water is thereafter continuously re-circulated. Process water goes through the distribution tubes, out the nozzles, and onto the containers.

The processing of a particular food will follow predefined temperature, pressure, and distribution rate profiles and formulas. As stated above, heated process water or direct steam injection may be used to influence temperature within the vessel. Conventional temperature means may be provided to control spray water temperature. Optional steam spreaders may be installed within the vessel above the water level, to distribute steam over the complete shell length. Controlled direct steam injection and/or heating of the spray water results in the pre-programmed temperature profile. Steam condensates are discharged to maintain the water working level. During the sterilization phase, temperature is preferably controlled to about +/−1° F. (+/−0.5° C.).

Pressure is provided by compressed air arranged to enter the vessel at select times. This results in the process following the pre-defined pressure profile. In one embodiment, the pressure within the retort is controlled by use of one or more proportional compressed air and pressure relief valves. Pressure is preferably controlled to about +/−0.4 psi (+/−0.025 bar).

A control system orchestrates the entire process, including applying spray water, regulating internal temperature, and modulating valves for compressed air inlet and pressure relief.

While the preferred embodiment of the invention has been illustrated and described, it will be appreciated that various changes can be made therein without departing from the spirit and scope of the invention. For example, the process fluid is typically water, though other fluids may be considered for use as well.

The embodiments of the invention in which an exclusive property or privilege is claimed are defined as follows:

1. In a retort vessel with at least one processing station and a processing method that includes spraying process fluid onto a container having a paperboard component at a given total flow rate and pressure, a method improvement comprising spraying processing fluid onto the paperboard and working at a flow rate and pressure calculated to have a minimal droplet impact on the containers using one or more nozzles producing a solid cone spray pattern at a spray angle in the range of about 100 to about 115 degrees.

2. The method improvement according to claim 1, wherein the nozzles are located within the vessel to result in a minimum distance between the nozzles and the container of about 70 mm.

3. The method improvement according to claim 1, wherein the distance between the container and nozzle is in the range of about 70 mm to about 200 mm.

4. The method improvement according to claim 1, wherein there are at least four upper distribution pipes and corresponding nozzles at a processing station.

5. The method improvement according to claim 1, further comprising at least one distribution pipe and a corresponding solid cone nozzle along the side of the container at a processing station.

6. The method improvement according to claim 1, wherein each nozzle has a flow rate in the range of about 5.5 liters/mm to about 7 liters/mm.

7. The method improvement according to claim 6, wherein the total flow rate of the retort is in the range of about 24 m3/hr to about 31 m3/hr, as per cubic meter load.

8. The method improvement according to claim 1, wherein spray fluid is supplied to the nozzles at a pressure in the range of about 0.7 bar to about 1.5 bar.

9. The method improvement according to claim 1, further comprising providing an overpressure to the vessel via compressed air.

10. The method improvement according to claim 9, wherein providing an overpressure includes using one or more proportional compressed air and pressure relief valves.

11. The method improvement according to claim 1, wherein the process fluid is water.

12. In a retort vessel with at least one processing station and a processing method that includes spraying process fluid onto a container at a given total flow rate and pressure; the container including a paperboard component; a method improvement comprising using one or more nozzles producing a solid cone spray pattern at a spray angle of about 80 degrees or greater resulting in a real impact value of about 0.00012 kg/cm² or less.

13. In a retort vessel with at least one processing station and a number of nozzles for spraying process fluid onto a stationary paperboard container at a given total flow rate and pressure, an improvement calculated to impose a minimal droplet impact on the container comprising at least one nozzle generating a solid cone spray pattern at a spray angle in the range of about 90 degrees or greater.

14. The improvement according to claim 13, wherein the nozzle has a spray angle of in the range of about 100 degrees to about 115 degrees.

15. The improvement according to claim 13, wherein the nozzles are located in the vessel to result in a distance between the container and the nozzles in the range of about 70 mm to about 200 mm.

16. The improvement according to claim 13, wherein there are at least seven nozzles at a processing station, extending across the vessel.

17. The improvement according to claim 13, wherein each nozzle has a flow rate in the range of about 5.5 liters/mm to about 7 liters/mm and the total flow rate of the retort is in the range of about 24 m³/hr to about 31 m³/hr, as per cubic meter load.

18. The improvement according to claim 13, wherein spray fluid is supplied to the nozzles at a pressure in the range of about 0.7 bar to about 1.5 bar.

19. The improvement according to claim 13, further comprising one or more compressed air valves to insert an overpressure into the vessel during processing.

20. In a retort vessel with at least one processing station and a processing method that includes spraying process fluid onto a container at a given total flow rate and pressure; the container including a paperboard component; a method improvement comprising using one or more solid cone nozzles having a spray angle in the range of about 100 to about 115 degrees and providing an overpressure to the vessel via compressed air.

* * * * *

UNITED STATES PATENT AND TRADEMARK OFFICE
CERTIFICATE OF CORRECTION

PATENT NO.      : 7,104,465 B2
APPLICATION NO. : 10/435491
DATED           : September 12, 2006
INVENTOR(S)     : G. Persoons et al.

Page 1 of 1

It is certified that error appears in the above-identified patent and that said Letters Patent is hereby corrected as shown below:

| COLUMN | LINE | ERROR |
|---|---|---|
| (74) | Attorney, Agent or Firm | "pllc" should read --PLLC-- |
| (57) Pg. 1, col. 2 | Abstract 8 of text | "rate if each nozzle" should read --rate of each nozzle-- |
| (57) Pg. 1, col. 2 | Abstract 21 of text | "Impact" should read --impact-- |
| 6 (Claim 6, | 17 line 3) | "liters/mm to about 7 liters/mm." should read --liters/min to about 7 liters/min.-- |
| 6 (Claim 7, | 20 line 3) | "m3/hr to about 31 m3/hr," should read --m$^3$/hr to about 31 m$^3$/hr,-- |
| 6 (Claim 14, | 48 line 2) | After "angle" delete "of" |
| 6 (Claim 17, | 48 lines 2-3) | "5.5 liters/mm to about 7 liters/mm" should read --5.5 liters/min to about 7 liters/min-- |

Signed and Sealed this
Thirteenth Day of September, 2011

David J. Kappos
*Director of the United States Patent and Trademark Office*

(12) EX PARTE REEXAMINATION CERTIFICATE (9645th)
United States Patent
Persoons et al.

(10) Number: US 7,104,465 C1
(45) Certificate Issued: May 13, 2013

(54) WATER SPRAY RETORT SYSTEM SUITABLE FOR PAPERBOARD PACKAGES

(75) Inventors: Gustaaf Persoons, Brecht (BE); Hans De Cock, Sint-Niklaas (BE); Marc Roels, Sint-Niklaas (BE)

(73) Assignee: John Bean Technologies Corporation, Chicago, IL (US)

Reexamination Request:
No. 90/012,696, Sep. 25, 2012

Reexamination Certificate for:
Patent No.: 7,104,465
Issued: Sep. 12, 2006
Appl. No.: 10/435,491
Filed: May 9, 2003

Certificate of Correction issued Sep. 13, 2011

(51) Int. Cl.
*B05B 9/06* (2006.01)
*B05B 1/08* (2006.01)
*B05B 9/00* (2006.01)
*B05B 1/32* (2006.01)

(52) U.S. Cl.
USPC ........... 239/100; 239/101; 239/124; 239/126; 239/270; 239/450; 239/548

(58) Field of Classification Search
None
See application file for complete search history.

(56) References Cited

To view the complete listing of prior art documents cited during the proceeding for Reexamination Control Number 90/012,696, please refer to the USPTO's public Patent Application Information Retrieval (PAIR) system under the Display References tab.

*Primary Examiner* — Joseph A. Kaufman

(57) ABSTRACT

A retort is described for use with paperboard containers (48) to reduce moisture absorption during processing of foodstuffs therein. The improvement includes using solid cone spray nozzles (50) with spray angles in the range of about 100 degrees to about 115 degrees. In one embodiment, the distance (D') between the nozzles and the container is in the range of about 70 mm to about 200 mm. In another embodiment, the flow rate of each nozzle (50) is reduced relative to known systems, while the total vessel flow rate is kept the same as per cubic meter load. Further, an overpressure may be added to the vessel via compressed air. In accordance with other aspects, an impact reduction is used which relates nozzle flow rate, pressure, distance, etc. with moisture absorption in paperboard containers.

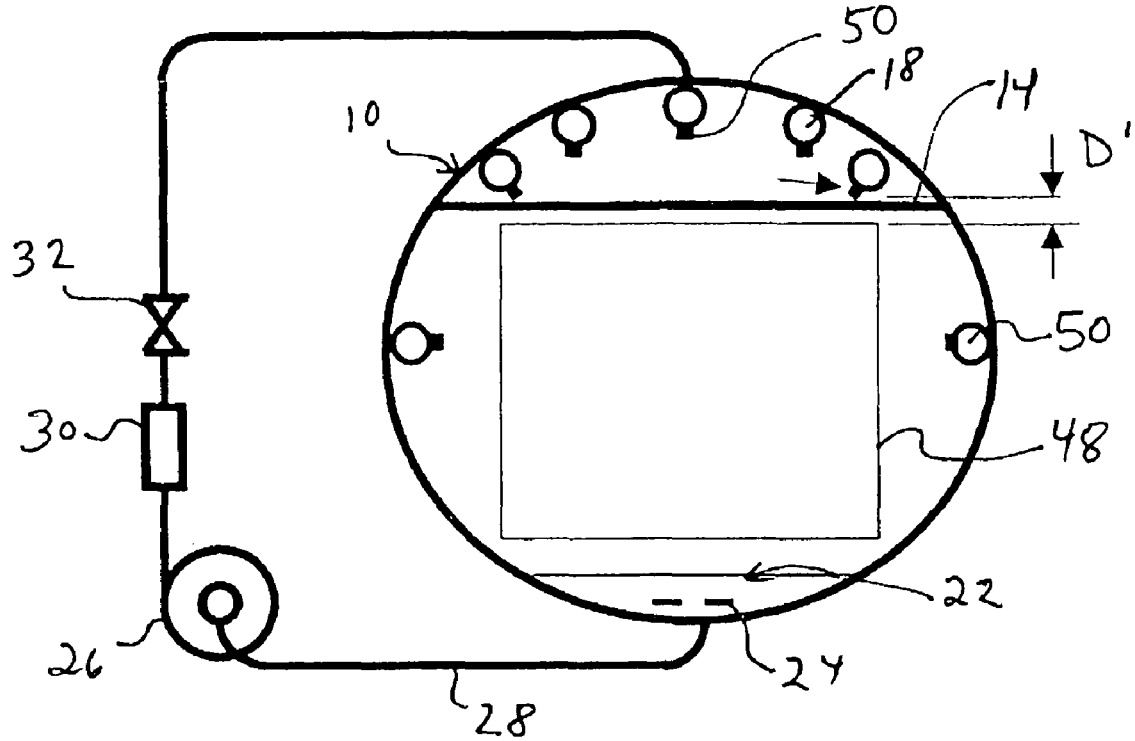

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 9, 11, 13, 14 and 20 is confirmed.

Claims 2-8, 10, 12 and 15-19 were not reexamined.

* * * * *

(12) EX PARTE REEXAMINATION CERTIFICATE (10373rd)
United States Patent
Persoons et al.

(10) Number: US 7,104,465 C2
(45) Certificate Issued: Oct. 30, 2014

(54) WATER SPRAY RETORT SYSTEM SUITABLE FOR PAPERBOARD PACKAGES

(75) Inventors: Gustaaf Persoons, Brecht (BE); Hans De Cock, Sint-Niklaas (BE); Marc Roels, Sint-Niklaas (BE)

(73) Assignee: John Bean Technologies Corporation, Chicago, IL (US)

Reexamination Request:
No. 90/012,866, May 13, 2013

Reexamination Certificate for:
Patent No.: 7,104,465
Issued: Sep. 12, 2006
Appl. No.: 10/435,491
Filed: May 9, 2003

Reexamination Certificate C1 7,104,465 issued May 13, 2013

Certificate of Correction issued Sep. 13, 2011

(51) Int. Cl.
*B05B 9/06* (2006.01)
*A62B 18/00* (2006.01)
*B05B 1/08* (2006.01)
*B05B 1/32* (2006.01)
*B05B 9/00* (2006.01)

(52) U.S. Cl.
USPC ........... 239/100; 239/101; 239/124; 239/126; 239/270; 239/450; 239/548

(58) Field of Classification Search
None
See application file for complete search history.

(56) References Cited

To view the complete listing of prior art documents cited during the proceeding for Reexamination Control Number 90/012,866, please refer to the USPTO's public Patent Application Information Retrieval (PAIR) system under the Display References tab.

*Primary Examiner* — Patricia Engle

(57) ABSTRACT

A retort is described for use with paperboard containers (48) to reduce moisture absorption during processing of foodstuffs therein. The improvement includes using solid cone spray nozzles (50) with spray angles in the range of about 100 degrees to about 115 degrees. In one embodiment, the distance (D') between the nozzles and the container is in the range of about 70 mm to about 200 mm. In another embodiment, the flow rate of each nozzle (50) is reduced relative to known systems, while the total vessel flow rate is kept the same as per cubic meter load. Further, an overpressure may be added to the vessel via compressed air. In accordance with other aspects, an impact reduction is used which relates nozzle flow rate, pressure, distance, etc. with moisture absorption in paperboard containers.

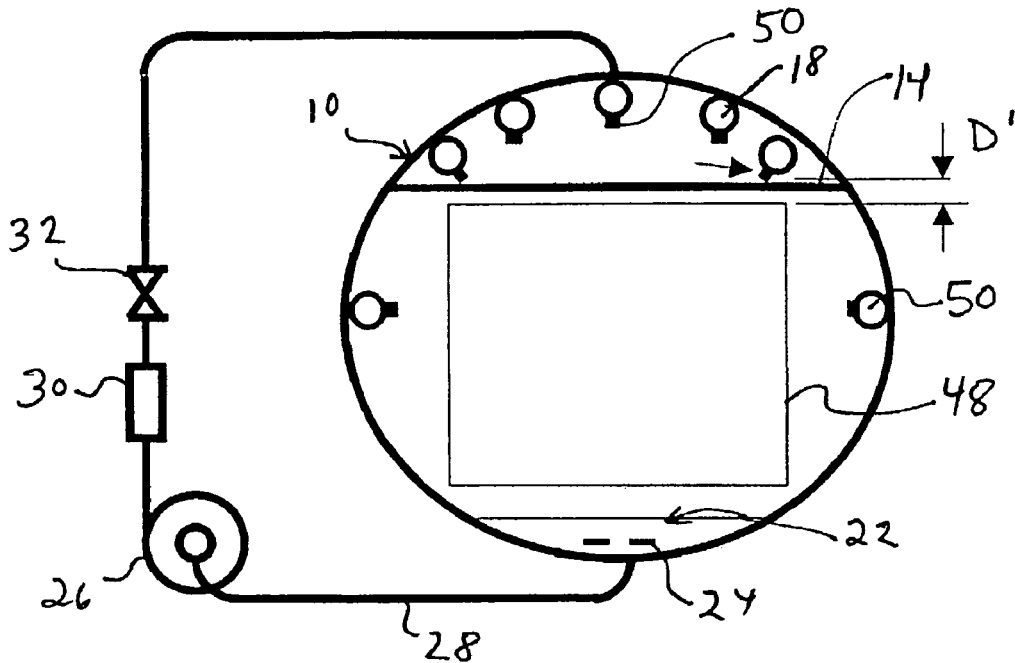

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 12, 13 and 20 are determined to be patentable as amended.

Claims 11 and 14, dependent on an amended claim, are determined to be patentable.

Claims 2-10 and 15-19 were not reexamined.

1. In a retort vessel with at least one processing station and a processing method that includes spraying process fluid onto a container having a paperboard component at a given total flow rate and pressure, a method improvement comprising spraying processing fluid onto the *container having the* paperboard *component with an exposed paperboard edge* and [working at a] *the* flow rate and pressure calculated to have a minimal droplet impact on the [containers] *paperboard container components* using one or more nozzles producing a solid cone spray pattern at a spray angle in the range of about 100 to about 115 degrees.

12. In a retort vessel with at least one processing station and a processing method that includes spraying process fluid onto a container at a given total flow rate and pressure; the container including a paperboard component; a method improvement comprising using one or more nozzles producing a solid cone spray pattern at a spray angle of about 80 degrees [or greater] *to about 115 degrees to spray the processing fluid, the flow rate and pressure of the processing fluid* resulting in a real impact value *on the paperboard container components with an exposed paperboard edge* of about 0.00012 kg/cm$^2$ or less.

13. In a retort vessel with at least one processing station and a number of nozzles for spraying process fluid onto a stationary paperboard container *within the retort vessel* at a given total flow rate and pressure, an improvement calculated to impose a minimal droplet impact on the container *having an exposed paperboard edge* comprising at least one nozzle generating a solid cone spray pattern at a spray angle in the range of about 90 degrees [or greater] *to about 115 degrees*.

20. In a retort vessel with at least one processing station and a processing method that includes spraying process fluid onto a container at a given total flow rate and pressure; the container including a paperboard component; a method improvement comprising using one or more solid cone nozzles having a spray angle in the range of about 100 to about 115 degrees *to spray the processing fluid, the flow rate and pressure of the processing fluid calculated to impose a minimal droplet impact on the container,* and providing an overpressure *condition within the retort vessel, the overpressure provided* to the vessel via compressed air.

* * * * *